July 9, 1957 T. J. ZELLER 2,798,568
CAB-OVER ENGINE TRUCK HAVING A LIFT-TYPE CAB THEREON
Filed Feb. 15, 1956 6 Sheets-Sheet 1
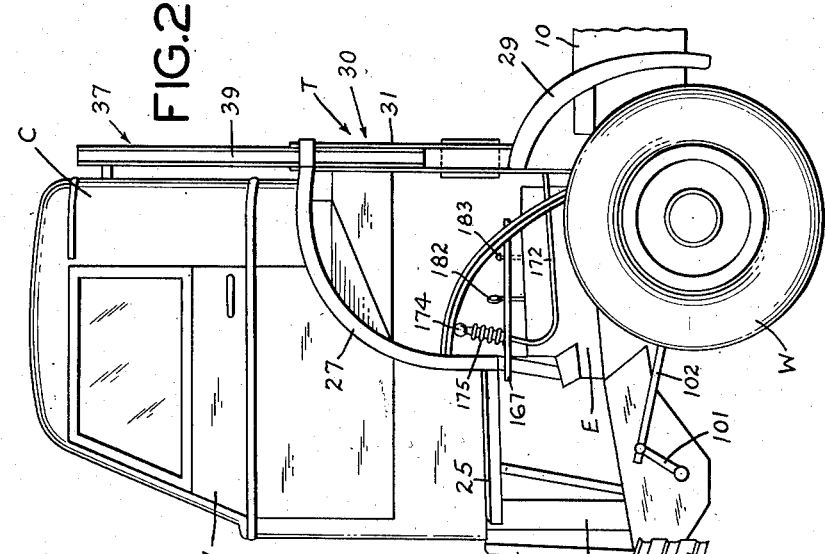
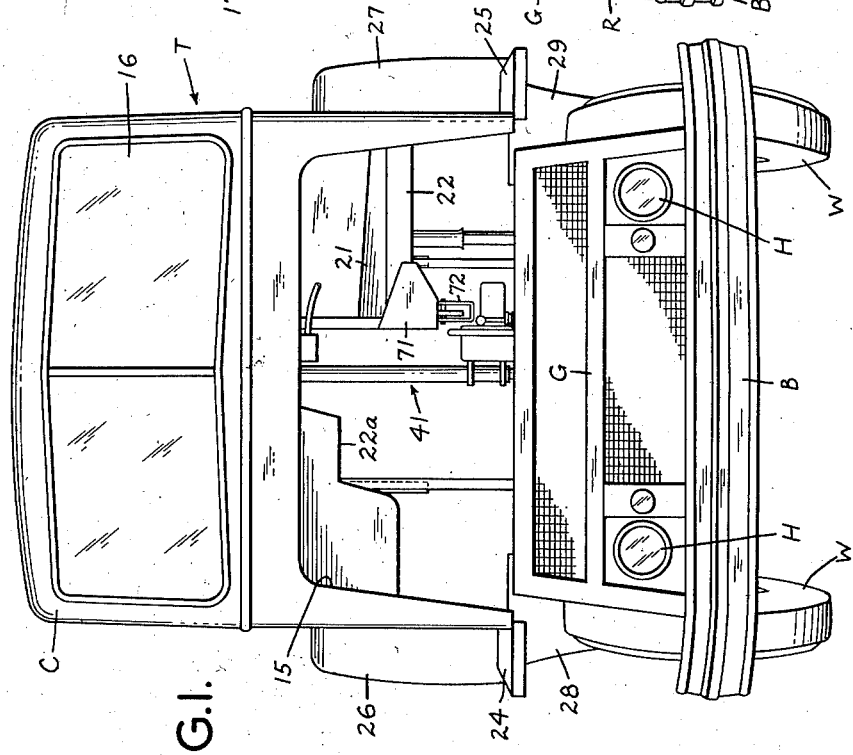
INVENTOR
THEODORE J. ZELLER
BY
HIS ATTORNEYS

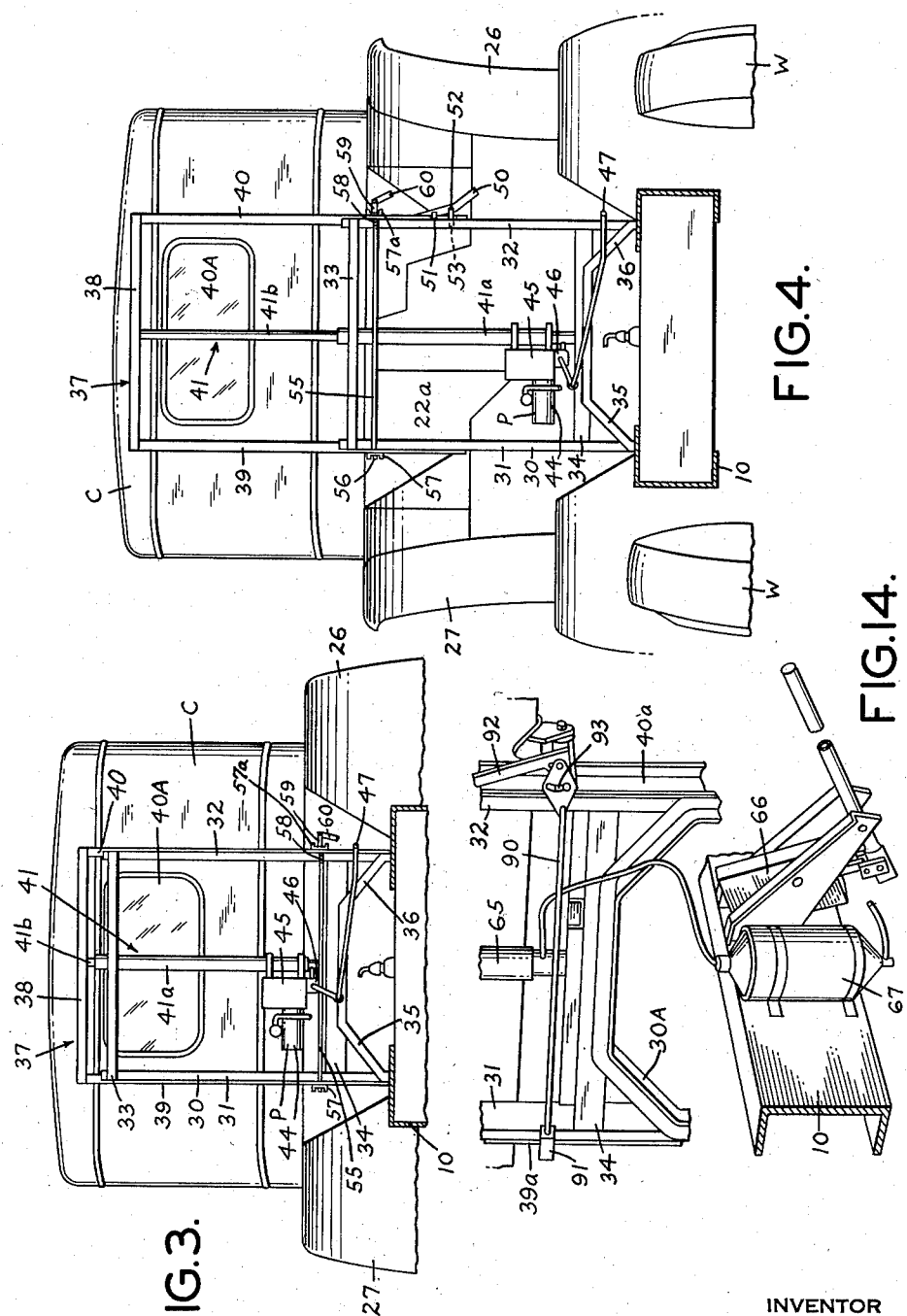

July 9, 1957 T. J. ZELLER 2,798,568
CAB-OVER ENGINE TRUCK HAVING A LIFT-TYPE CAB THEREON
Filed Feb. 15, 1956 6 Sheets-Sheet 4
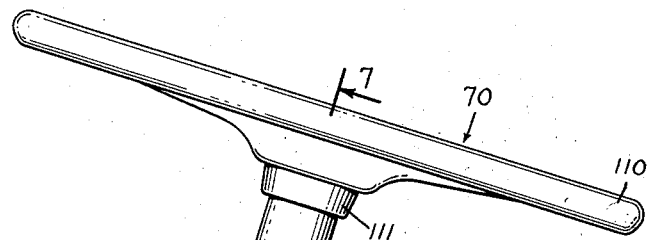
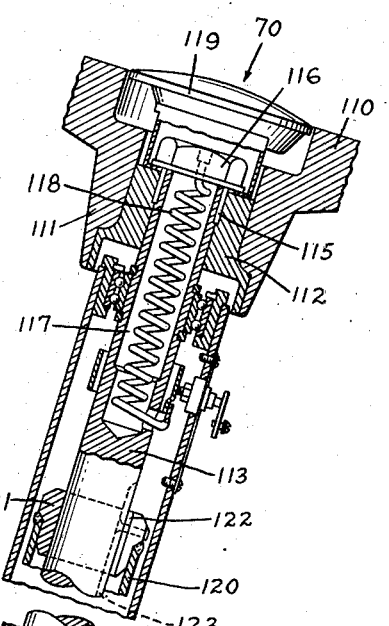
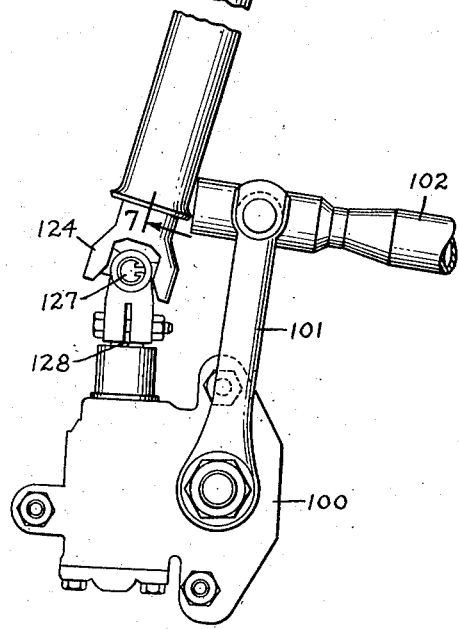
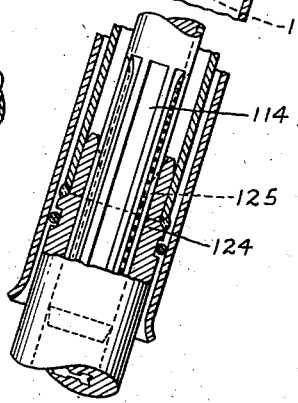
INVENTOR
THEODORE J. ZELLER
BY
HIS ATTORNEYS

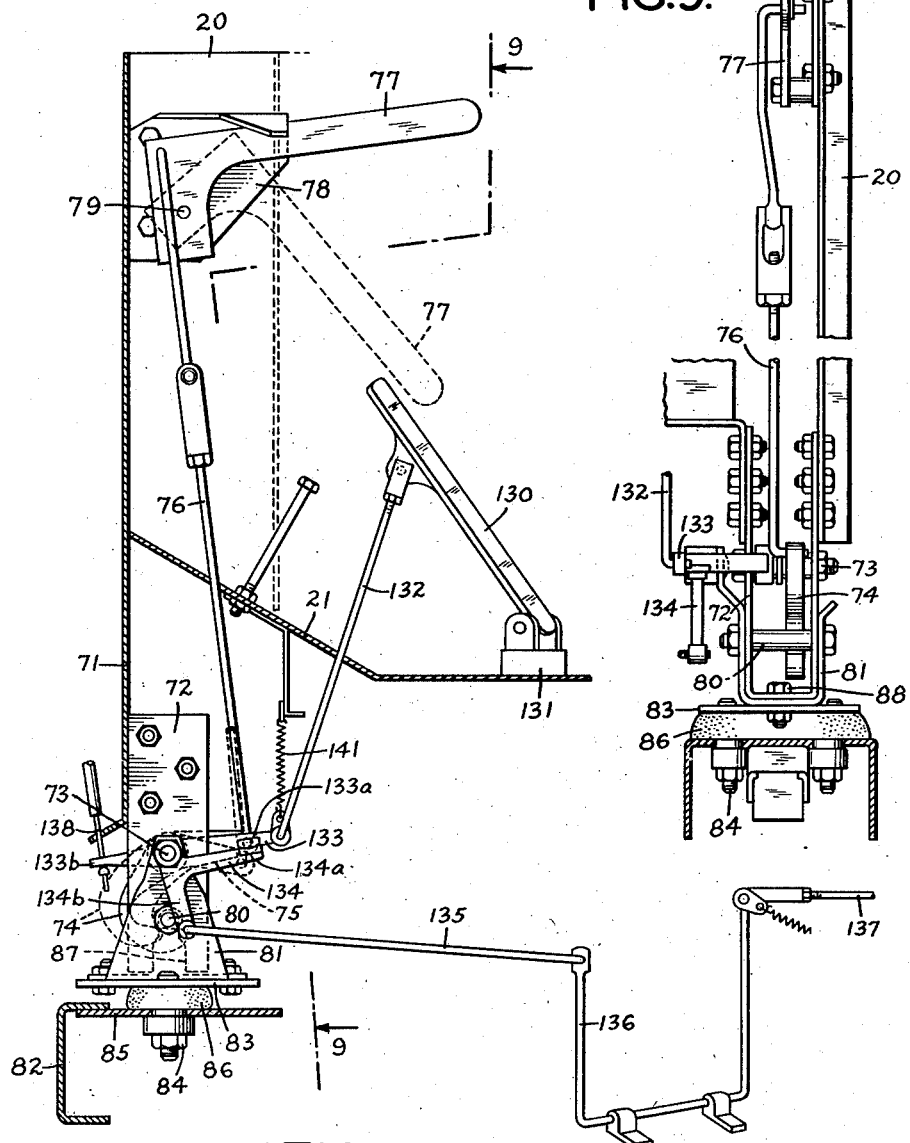

July 9, 1957  T. J. ZELLER  2,798,568
CAB-OVER ENGINE TRUCK HAVING A LIFT-TYPE CAB THEREON
Filed Feb. 15, 1956   6 Sheets-Sheet 6
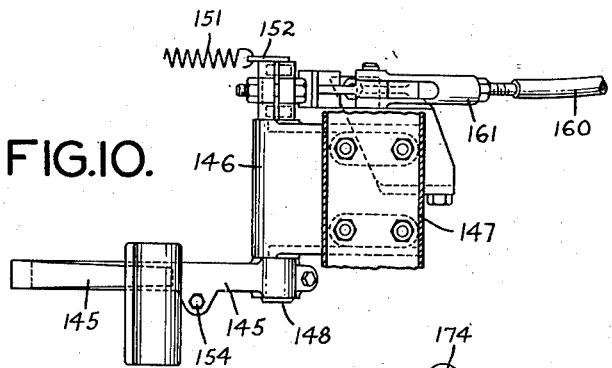
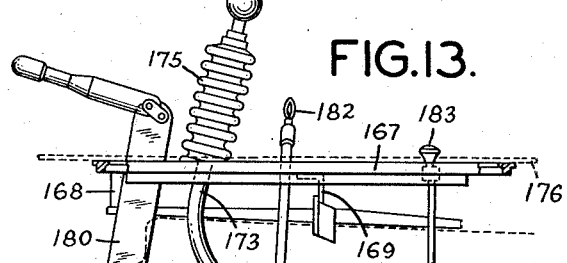
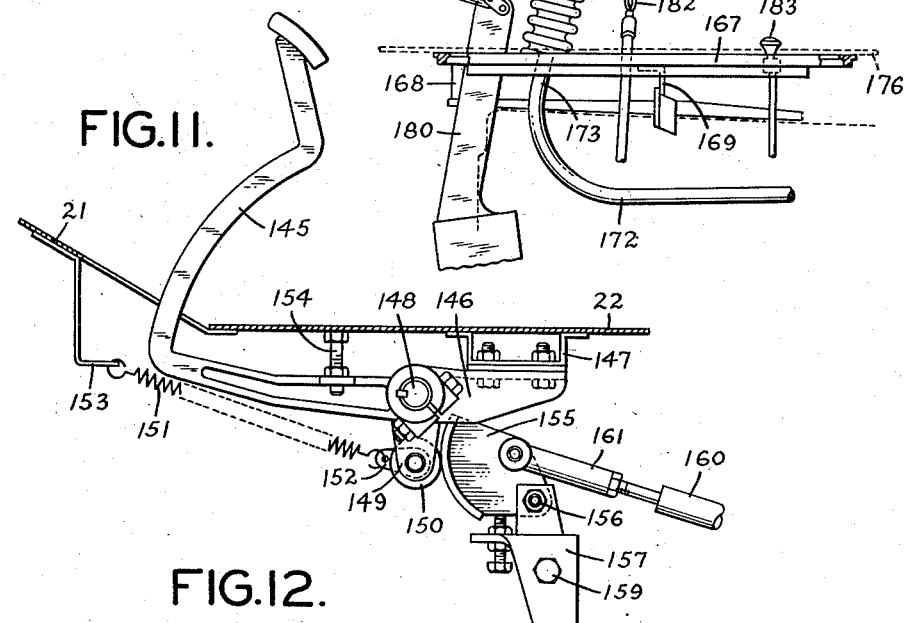
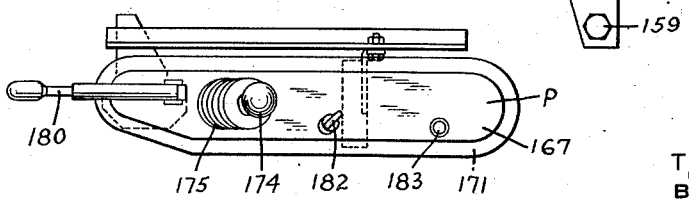
INVENTOR
THEODORE J. ZELLER
BY
HIS ATTORNEYS ic Office 2,798,568
Patented July 9, 1957

2,798,568
CAB-OVER ENGINE TRUCK HAVING A LIFT-TYPE CAB THEREON

Theodore J. Zeller, Allentown, Pa., assignor, by mesne assignments, to Mack Trucks, Inc., a corporation of New York Application February 15, 1956, Serial No. 565,566

7 Claims. (Cl. 180—89)

This invention relates to improvements in the cab structure of motor vehicles such as trucks, tractors for tractor-trailer combinations and the like, and it relates particularly to an improved type of cab construction by means of which access is had more readily to the engine and other operating components of the vehicle.

In recent years, due to the increased transportation of freight by means of trucks and tractor-trailer trucks, many regulations have been made for the control of the weight and length of such vehicles. In order to comply with the regulations without sacrificing hauling capacity, efforts have been made to shorten the overall length of the cab and hood of vehicles so that the storage box of the truck or trailer can be of maximum length while complying with the regulations. To that end, the cabs of tractors and trucks have been mounted over the engine to keep the combined lengths of these components at a minimum. Location of the driver's cab over the engine has introduced difficulties in gaining access to the engine and transmission. Various arrangements for mounting the cabs have been devised for overcoming these difficulties. One arrangement consists in hinging the front end of the cab to the forward end of the frame so that the cab can be tilted forwardly to uncover the engine. Others have suggested that the cab might be hinged at one or both sides of the frame so that the cab can be rocked sideways in either direction to uncover the engine. Neither of these expedients is wholly satisfactory because the cab is still in the serviceman's way at one side or the front of the engine and free access cannot be had to all parts of the engine and its associated structure.

The present invention relates to a cab mounting structure in which the cab mounted over the engine is readily moved to such a position that access can be had to the engine from both sides and the front. More particularly, the present invention involves a structure by means of which the cab can be lifted up from the frame and held in a raised position so that free access can be had to the engine and its associated components from the front and both sides of the vehicle.

In addition to facilitating servicing of the vehicle, it can be handled in a much shorter fore-and-aft space because the overall length or width of the vehicle is not increased, as the cab is moved as is the case with the pivoted or tilting cab type mounts provided heretofore. Even in restricted quarters, ready access may be had to the engine for servicing and the like with the new cab mounting.

The invention further includes control mechanism for the vehicle involving disconnecting types of linkages by means of which the clutch and accelerator pedals, can be disconnected from components carried by the frame of the vehicle as the cab is raised and reconnected after servicing of the engine merely by lowering the cab into its operating position.

For a better understanding of the present invention reference may be had to the accompanying drawings in which:

Figure 1 is a view in front elevation of a typical vehicle having a cab suspension of the type embodying the present invention, the cab being shown in a raised position;

Figure 2 is a side elevational view of a part of a vehicle provided with the new vehicle cab structure, also illustrating the cab in its raised position;

Figure 3 is a rear elevational view of a portion of the vehicle illustrating the cab in its lowered or operating position;

Figure 4 is a view partially in section and partially in rear elevation of the vehicle cab in its raised position;

Figure 6 is a side elevational view of the steering wheel and the steering mechanism detached from the vehicle to illustrate the arrangement thereof;

Figure 7 is a view in section taken on line 7—7 of Figure 6 with portions of the steering mechanism broken away;

Figure 8 is a view in side elevation of the cab front lock mechanism and accelerator linkage for the vehicle, portions of the cab and the vehicle frame associated therewith being shown in section and partially broken away;

Figure 9 is a view in section taken on line 9—9 of Figure 8;

Figure 10 is a plan view and partly in section and partly broken away of the clutch pedal linkage between the cab and the components mounted on the vehicle frame;

Figure 11 is a view in side elevation and partly in section of the clutch pedal linkage shown in Figure 10;

Figure 12 is a plan view of a panel in the vehicle through which the gear shift lever, parking brakes and other controls extend;

Figure 13 is a view in side elevation of the panel as shown in Figure 12 with the controls mounted therein partly broken away; and Figure 14 is a perspective view of a manually operated hydraulic system for lifting the cab of the vehicle, the frame elements of the lift system being shown fragmentarily.

Figure 5:
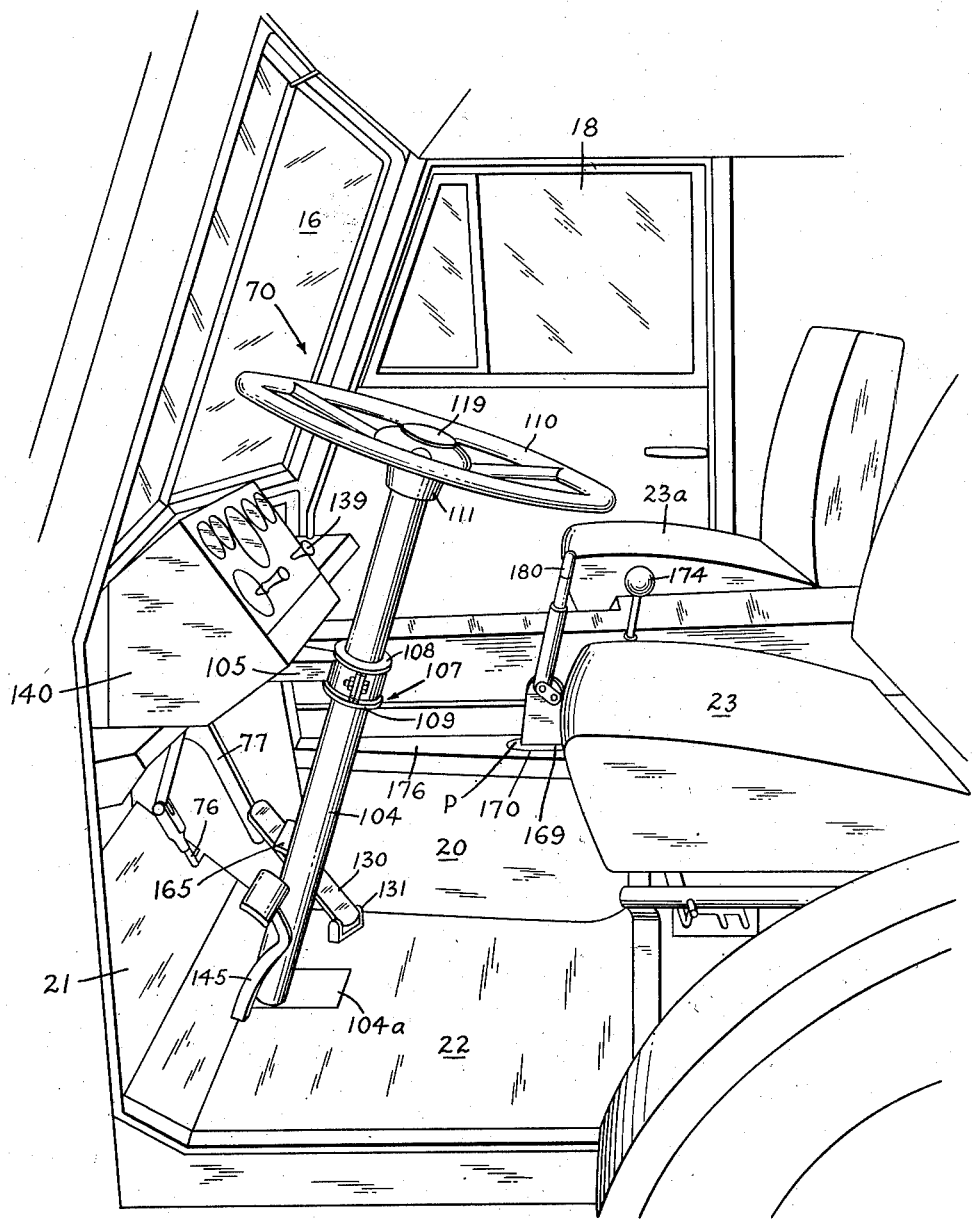
Figure 5 is a perspective view of the interior of the cab looking toward the driver's side of the cab.

The present invention will be described with relation to its application to a tractor for a tractor-trailer truck and including an internal combustion engine such as a gasoline or compression-ignition type. The tractor T includes a frame 10 suspended on the usual vehicle wheels W by means of any suitable type of spring, air or hydraulic suspension. The forward portion of the frame 10 carries the engine E and also has at its forward end the radiator R for the cooling system of the engine. The forward end of the frame may also carry the usual bumper B, radiator grille G and the headlights H. As shown particularly in Figure 2, the engine E extends forwardly of the front axle or axes of the wheels W with a major portion of the engine in advance of the wheels. The transmission (not shown) extends rearwardly from the engine and is connected by the conventional propeller shaft or the like to the rear or drive wheels (not shown) of the tractor T.

The tractor T is of the so-called cab-over engine type in which the cab C is positioned directly above the engine E and, as shown in Figure 1, is provided with a forward opening 15 to receive and fit around the radiator grille G when the cab is in its lowered and normal operating position. The cab C is provided with a windshield 16 and with the doors 17 and 18 by means of which the driver and his helper can enter and leave the cab. In order to clear the engine, the cab is provided with a centrally located tunnel 20 which extends rearwardly from the front wall of the cab to the back of the cab and, as shown in Figures 3 and 4, is open at its rear end 22a to improve circulation of air around the engine and also to provide space for connections for engine accessories and the like.

Mounted on opposite sides of the tunnel 20 are the driver's seat 23 and his assistant's or helper's seat 23a, these seats being of a conventional type.

Each side of the cab is provided with a step or tread plate 24 and 25 and with upwardly and rearwardly convexly curved fender sections 26 and 27 which cooperate with rearward halves 28 and 29 of the fenders which are fixed to the frame 10.

The cab C in accordance with the present invention is mounted in such a manner that it can be raised to give access to the engine E for servicing or repair. To that end, the frame 10 of the vehicle is provided with a generally rectangular framework 30 formed of outwardly-opening channel members 31 and 32 which are secured to the frame. The channel members 31 and 32 are joined near their upper ends by means of a cross rail 33 and near their lower ends by means of another brace or cross member 34 which is, in turn reinforced by means of diagonal braces 35 and 36 extending up from the frame 10 of the vehicle. The framework 30 is made sufficiently strong so that the cab C can be raised on it without substantially deflecting the framework 30 in a fore-and-aft direction.

Mounted on the back of the cab C is a cooperating, inverted generally U-shaped, framework 37 including a cross bar 38 and a pair of rails 39 and 40 which may also be of channel type, these rails being sufficiently smaller than the channel members 31 and 32 to enable them to slide in the channel members 31 and 32 so that the cab is guided by them in its up and down movement. The framework 37 is fixed to the body of cab C at three places adjacent the top, bottom and back of the cab in order to distribute the stresses in the cab and to prevent deflections of the frame 10 from being transmitted to the cab. The dimensions of the frame 37, as well as the framework 30 may be such that the rear-view window 40A is substantially fully uncovered.

A hydraulic jack 41 is connected between the frame 30 and the frame 37 so that upon extension of the jack 41, the cab is raised and upon retraction of the jack, the cab is lowered. Conveniently, the cylinder 41a of the jack may be fixed at its lower end to the cross bar 34 and its upper end extends through the cross bar 33. The piston 41b of the jack is connected to the cross bar 38 of the frame 37. A hydraulic pressure supplying means may be provided for projecting the piston 41b and raising the frame 37 and the cab C supported thereby. As illustrated in Figures 3 and 4, a conventional electrically driven hydraulic pressure supply unit P may be mounted on the cylinder 41a. The pressure supplying unit P includes a motor and pump 44 connected with the reservoir 45 for the hydraulic liquid. A control valve 46 is actuated by a manipulating handle 47 for supplying liquid under pressure to the lower end of the cylinder and discharging liquid from the other end of the cylinder. The motor-driven pump 44 is energized and de-energized by means of a suitable control switch (not shown). The power supply for the motor is the storage battery of the vehicle which may be mounted on the frame 10 behind the step 24 or 25 of the cab.

Inasmuch as the cab C is of substantial weight, locking means is provided for preventing accidental lowering of the cab when it is raised. As shown in Figure 4, the locking means may include a spring-biased lever 50 pivotally mounted on pivot block 51 carried by the channel member 40 and carrying a pivotally mounted bolt or pin 52 which can be engaged in a hole 53 in the side frame member 32. When the bolt or pin 52 is pushed into the hole 53, by the spring-biased means, the frame member 37 cannot drop even if all pressure in the cylinder below the piston rod 41b is lost.

An additional locking mechanism for holding the cab C either in its raised or lowered position is also provided. This locking mechanism includes an elongated bolt 55 having its head 56 in engagement with a bracket member 57 fixed to and projecting from the side frame member 39. The opposite threaded end 58 of the bolt extends through a similar bracket 57a on the side frame member 40 and is engaged by means of an internally threaded nut or sleeve 59 having a hinged handle 60 thereover by means of which the nut 59 can be tightened against the bracket 57a. In this way, the two brackets and the channel members 39 and 40 on which they are mounted can be squeezed together against the channel members 30 and 32 by tightening the nut 59, thereby frictionally locking the frames 30 and 37 together.

While the above-described system involving a motor-driven hydraulic lift system is preferred for heavy cabs, a manually actuated hydraulic system may be used, if desired. As shown in Figure 14, a manually-actuated system may include a jack 65 like the jack 41 for raising and lowering the cab, a hand pump 66 and a reservoir 67 for hydraulic fluid. The pump is connected to the jack 65 and upon actuation withdraws hydraulic fluid from the reservoir and forces it into the jack to cause the piston rod to be projected, thereby raising the cab. A selector valve is interposed between the pump and the jack or made as a part of the pump to trap liquid in the jack and thereby hold it in projected position. The selector valve may be reversed to allow liquid to drain back into the reservoir from the cylinder and allow the cab to drop by gravity to operating position.

The above-described systems enable the cab to be moved upwardly to give access to all parts of the engine, transmission and the like for easy servicing and thus overcome the disadvantages previously considered to be inherent in vehicles having the cabs thereof positioned over the engine. In making the cab movable it is, of course, desirable to provide connections between various controls for the vehicle disposed within the cab and components which are carried by the frame 10 and actuated from the cab. These connections must be so arranged as to permit relative movements of the parts when the cab is raised. Moreover, means must be provided to anchor the cab to the frame and prevent unwanted tilting or pitching of the cab relative to the frame during operation of the tractor. To that end, a quick releasable latch mechanism is provided for connecting the front of the cab to the front of the frame of the vehicle. As shown in Figures 1, 5, 8 and 9, that portion of the floor 21 of the cab in front of the driver's seat and adjacent to the steering mechanism 70 has a vertically extending plate member 71 thereon which carries adjacent to its lower end a substantially U-shaped bracket 72 serving to support a cross shaft or bolt 73 on which a hook-like latch 74 is pivotally mounted. The hook-like latch 74 has a rearwardly extending arm 75 that is connected by means of an upwardly extending link 76 with a hand-operated lever 77 mounted on a bracket 78 carried by the vertical wall to which the tunnel 20 is secured, which supports the front of the vehicle cab. A pivot pin 79 supports the hand-operated lever 77 so that it can rock up to full line position shown in Figure 8 in which the hook is in its locking position and downwardly to the dotted line position in which the hook is released. Cooperating with the hook 74 is a cross bolt 80 or detent also carried by means of a U-shaped bracket 81 carried by the front element or cross frame member 82 of the vehicle frame. The bracket 81 is mounted on a plate 83 which is secured by means of a plurality of bolts and nuts 84 to a rearwardly extending plate 85 welded or otherwise secured to the front cross frame member 82. A rubber cushion or block 86 is interposed between the plates 83 and 85 to minimize the transmission of vibration from the frame to the cab. As indicated in Figure 8, the U-shaped bracket 72 has a transverse slot 87 in its lower end so that it can straddle the cross bolt 80. The above-described construction firmly interlocks the front end of the cab and the vehicle frame, but enables the cab to be released merely by pushing the hand lever 77 down. The latching mechanism just described, in conjunction with the locking mechanism 55—60 shown in Figure 4, for the rear end of the cab effectively prevent unwanted relative movement between the cab and frame.

The locking mechanisms for the rear of the cab can be modified, if desired. For example, as shown in Figure 14, the locking element for the rear end of the cab includes a cross link 90 connected to an extension 91 on the sliding side frame element 39a. The opposite sliding side frame element 40a is provided with a pivotally mounted lever 92 which has a pin and cam slot connection 93 with the right-hand end of the link 90. The shape of the slot in the device may be such that when the lever 92 is rocked to the right, the tension on the link 90 is released enabling the frame elements 39a and 40a to slide freely. When the handle 92 is in the position shown, the link 90 is tensioned to lock the two frames together.

To enable the cab to be lifted, means must be provided for allowing relative movement between the portion of the steering wheel mechanism 70 carried by the vehicle cab C and the steering mechanism 100 which is mounted on the frame 10 of the vehicle and includes the steering arm 101 and the drag link 102, as shown in Figures 2 and 6. The steering mechanism 70 shown in Figure 5 includes a steering column 104 which is mounted at an acute angle to the floor 22 in front of the driver's seat 23 and is held in position by means of a supporting arm 105 extending rearwardly from the forward bulkhead or wall 71 of the cab. The arm 105 has a split sleeve at its outer end for receiving a rubber bushing 107 which extends around the steering column 104 between the flanges 108 and 109 thereon. The lower end of the steering column 104 is mounted in a plate 104a which covers a hole in the floor 22 of the cab and permits limited relative movement therebetween.

The steering gear box 100 which may be of any desired type such as, for example, of the gear and sector, rack and pinion, or cam and lever type, is mounted on the inside of the frame side member and does not move with the cab as does the steering column and the steering wheel thereon. In order to enable them to move relatively while maintaining a connection between them, an extensible connection is provided, as shown in Figures 6 and 7. A hub 111 on the steering wheel 110 is mounted on a hub portion 112 on the upper end of a shaft 113 having splines 114 at its lower end. Longitudinal serrations 115 and a lock nut 116 secure the hub portion 112 to the shaft 113. A bore 117 is formed in the upper end of the shaft 113 to receive the wire 118 extending to the horn button and switch 119 centrally mounted in the steering wheel. The lower splined end 114 of the shaft 113 is received in a concentric tube or quill 120 which has an insert 121 therein provided with an inwardly extending key 122 which is received slidably in a keyway 123 extending throughout the major portion of the length of the shaft 113. Thus, the tube or quill shaft 120 can slide lengthwise of the shaft 113 but cannot rotate relative to it. A thickened sleeve portion 124 is welded or otherwise secured to the tube 120 and is provided with internal splines 125 for receiving the splines 114 on the shaft 113 when the tube 120 and the shaft 113 are fully telescoped, as shown in Figure 7. When the cab is raised, the shaft 113 can slide upwardly in the tube 120 so that the splines 114 and 125 disengage, but nevertheless a power transmitting connection is maintained between the shafts by means of the key 122 and keyway 123. As shown in Figure 6, the lower end of the sleeve portion 124 is connected by means of a universal joint 127 to the drive shaft 128 of the steering gear mechanism 100 so that they can rock relative to each other. The steering mechanism, therefore, is of such design that it can extend and contract in accordance with the movement of the cab in a vertical direction and steering control is maintained so that, if necessary, the wheels of the vehicle can be steered even with the vehicle cab in a raised position.

Means are also provided for disconnecting and connecting the accelerator pedal and the like as the cab is raised and lowered. The disconnect for the accelerator pedal is best shown in Figures 5, 8 and 9. As will be seen in Figures 5 and 8, the accelerator pedal 130 is supported pivotally on a pivot block 131 fixed to the floor 22 of the cab. A link 132 connects the pedal 130 to a rocker arm 133 pivotally mounted on the cross bolt 73 which supports the latch 74. The lever 133 is supported on the U-shaped member 72 and cooperates with a bell crank lever 134 which is pivotally mounted on the upper left-hand side of the U-shaped bracket 81, as shown in Figure 9. As shown in Figure 8, rearwardly extending arm 134a of the bell crank lever 134 is disposed below a laterally extending lug 133a on the lever 133 when the cab is in the lowered position so that when the accelerator pedal 130 is depressed, it will move through the link 132 and the lever 133 to rock the bell crank lever 134 in a clockwise direction. Clockwise movement of the bell crank 134 is transmitted by means of a link 135 pivotally connected to the lower arm 134b of the bell crank 134 either directly to the carburetor or other fuel control mechanism of the engine or through a dual arm lever 136 and associated link 137 if required to pass by other components of the vehicle.

Manual control of the carburetor or other fuel supply device is also obtained by providing the lever 133 with a forwardly extending arm 133b and connecting this arm by means of a Bowden wire 138 to a manual fuel control knob 139 on the instrument panel 140 of the vehicle, which is fixed to and carried by the vehicle cab. Inasmuch as the instruments thereon are largely controlled by flexible shafts or by flexible electrical wiring, no special means need be provided to enable the instruments to be mounted fixedly on the instrument panel and to connect them to other components of the vehicle mounted on the frame 10.

The accelerator pedal is, of course, biased by means of a spring 141 to an idling position.

In vehicles having a manually-operated multispeed transmission, a clutch pedal is also mounted on the floor of the cab and means must be provided for enabling the clutch pedal to be disconnected from and connected to the clutch linkage when the cab is raised and lowered. A suitable mechanism for this purpose is disclosed in Figures 10 and 11 of the drawings. As shown in Figure 10, the clutch pedal 145 is mounted for rocking movement on a bracket 146 secured to a reinforcing channel member 147 extending downwardly from the floor 22 of the cab. The pedal 145 is fixed to a rotary shaft 148 mounted rotatably in the bracket 146 and carrying at the opposite end from the pedal an arm 149 having a roller 150 rotatably mounted on its outer end. The clutch pedal is normally urged to a raised position by means of a spring 151 extending between an ear 152 on the arm 149 and a bracket 153 extending downwardly from the floor portion 21. The upper limit of movement of the pedal may be regulated by means of an adjusting screw 154 mounted in the upper side of the clutch pedal arm. The above-described structure moves with the cab during its raising and lowering movements and in its lowered position, the roller 150 engages a cam plate 155 which is pivotally mounted on a bolt 156 carried by a bracket 157 secured to the vehicle frame by means of the bolts 159. The cam plate is connected by means of a link 160 and a clevis 161 to the clutch release arm (not shown) so that as the cam plate 155 is rocked clockwise, the clutch is released. When the clutch pedal is depressed, counterclockwise movement of the arm 149 will cause the roller 150 to move the cam plate 155 clockwise around its pivot 156 to release the clutch. Inasmuch as a positive connection is not provided between the roller 150 and the cam plate 155, it will be apparent that the clutch pedal is disconnected from the clutch and connected with it automatically as the cab is raised and lowered.

The brake pedal 165 shown in Figure 5 can be connected to a master cylinder of a hydraulic brake system, mounted on and movable with the cab and connected to the brakes by means of a flexible conduit system. If the braking system is of the air-brake type, the air control valve can be mounted below the floor of the cab and is connected by flexible air hoses to the air supply tank and to the brake actuating motor.

When the vehicle is provided with a manually shifted transmission, the gear shift lever must also be arranged to be freed from the vehicle cab or the frame as must the parking brake and such other elements as the manual choke, oil level gauge and the like of the vehicle. To that end, the tractor is provided with a panel P, shown in Figures 12 and 13, which may include a metal plate 167 supported by means of brackets 168 and 169 on top of the engine itself or on a suitable framework adjacent to the engine so that the panel P does not move with the cab. The panel has a gasket 171 around its edges which bear against the underside of a generally flat and horizontal section 176 of the tunnel adjacent to the driver's seat having a hole 170 therein of generally similar shape but smaller size than the plate 167. The gear shift lever 172 extends forwardly from the transmission and has an upwardly bent end 173 carrying a knob 174 on the upper end and passing through a rubber bellows 175 which has its lower end secured to the panel 167. The rubber bellows permits movement of the gear shift lever through conventional shift patterns and provides a closure for the opening through which the lever 172 extends.

A parking brake lever 180 also extends through the panel. The parking brake lever may control a separate brake on the propeller shaft or the wheel brakes of the tractor as desired.

Also mounted in the panel P may be the dip stick and its tube 182 and a choke button 183 or other element. Inasmuch as these elements are carried by the frame, it is only necessary to provide clearance for them through the hole 170 in the tunnel to enable the cab to be released from them. Nevertheless the rubber seal or gasket 171 provides a tight seal against entry of the exhaust fumes and the like into the vehicle cab through the hole in the tunnel.

The connections between the controls in the cab and the corresponding elements carried by the frame 10 effectively frees the cab for movement relative to the frame to facilitate servicing of the engine, transmission and the like. It is only necessary to release the locks in the front and the rear of the cab and to actuate the hydraulic pressure system either by mechanical means or manually to raise the cab for servicing or repair.

It will be understood, of course, that the mechanism for raising and lowering the cab may be modified substantially depending upon the service conditions and the size and weight of the components of the cab. For example, instead of using one cylinder for elevating the cab, it is possible to use two or more cylinders, and the cylinders themselves may serve as the guiding means for the cab and thus may take the place of the frames 30 and 37 described above. Moreover, in some circumstances, particularly for light-weight cabs, other mechanism such as screw jacks manually or electrically driven or other hoisting devices may be used to raise and lower the cab. Accordingly, the form of the invention described herein should be considered as illustrative and not as limiting the scope of the following claims.

I claim:

1. In a vehicle having a frame, an engine mounted in said frame adjacent to the front end thereof and wheels supporting said frame and driven by said engine; the combination of a cab for an operator of said vehicle, said cab being mounted on said frame adjacent to said front end of said frame and disposed principally above said engine and normally covering it, a pair of guide elements fixed to said frame and extending upwardly therefrom behind said cab, a framework fixed to the back of said cab and having parallel slide portions slidably engaging said guide elements to guide said cab for raising and lowering movement relative to said cab and support the cab on said frame, and power actuated means interposed between said frame and said framework for raising said cab relative to said frame to uncover said engine.

2. In a vehicle having a frame, wheels supporting said frame and an engine mounted near the front end of said frame; the combination of a cab for the operator of said vehicle, means guiding said cab for movement up and down relative to said frame and maintaining it against tilting relative to said frame, means carried by said frame and connected to said cab for raising said cab relative to said frame, a steering column in said cab, a steering wheel rotatable relative to said column, steering mechanism mounted in said frame, and an extensible and contractible connection between said steering wheel and said steering mechanism in all raised and lowered positions of said cab.

3. The vehicle set forth in claim 2 in which said extensible and contractible connection comprises a pair of telescopically related shafts connected to said steering wheel and said steering mechanism and means for slidably and non-rotatably connecting said shafts.

4. In a cab-over-engine vehicle having a frame with an engine adjacent the front end thereof and a cab movable relative to the frame from an operating position covering the engine to a servicing position uncovering said engine, the combination of a control pedal in said cab, an engine accessory mounted on said frame, a lever pivotally mounted on the bottom of said cab adjacent to said frame, means connecting said pedal to said lever, a member pivotally mounted on said frame and engageable by said lever when said cab is in said operating position and movable by said lever in response to movement of said pedal, and means connecting said member to said accessory to render it responsive to movement of said pedal.

5. In a vehicle having a frame, wheels supporting said frame, an engine mounted near the front end of said frame; the combination of a cab for the operator of said vehicle, means guiding said cab for movement up and down relative to said frame and maintaining it against tilting relative to said frame, means carried by said frame and connected to said cab for raising said cab relative to said frame, a tunnel in said cab to overlie said engine, said tunnel having a substantially horizontal surface having a hole therein, a panel mounted on said frame to support engine accessories, said panel being disposed below and closing said hole when said cab is lowered.

6. In a vehicle having a frame, wheels supporting said frame, an engine mounted near the front end of said frame; the combination of a cab for the operator of said vehicle, means guiding said cab for movement up and down relative to said frame and maintaining it against tilting relative to said frame, means carried by said frame and connected to said cab for raising said cab relative to said frame, a tunnel extending lengthwise of said cab to house the upper portion of said engine, a driver's seat in said cab to one side of said tunnel, said tunnel having a hole therein adjacent to said driver's seat, a panel fixedly mounted on said frame, controls for said vehicle extending through said panel, said panel being disposed below and in contact with said tunnel and closing said opening when said cab is lowered.

7. The vehicle set forth in claim 6 in which said controls comprise a parking brake lever and a gear shift lever.

References Cited in the file of this patent

UNITED STATES PATENTS

| | | |
|---|---|---|
| 2,143,983 | Howell | Jan. 17, 1939 |
| 2,148,308 | Spear | Feb. 21, 1939 |
| 2,306,348 | Spear | Dec. 22, 1942 |

FOREIGN PATENTS

| | | |
|---|---|---|
| 585,235 | Great Britain | Feb. 3, 1947 |